July 5, 1927.
T. F. W. MEYER
VERNIER DEVICE
Filed Dec. 1, 1922
1,634,676
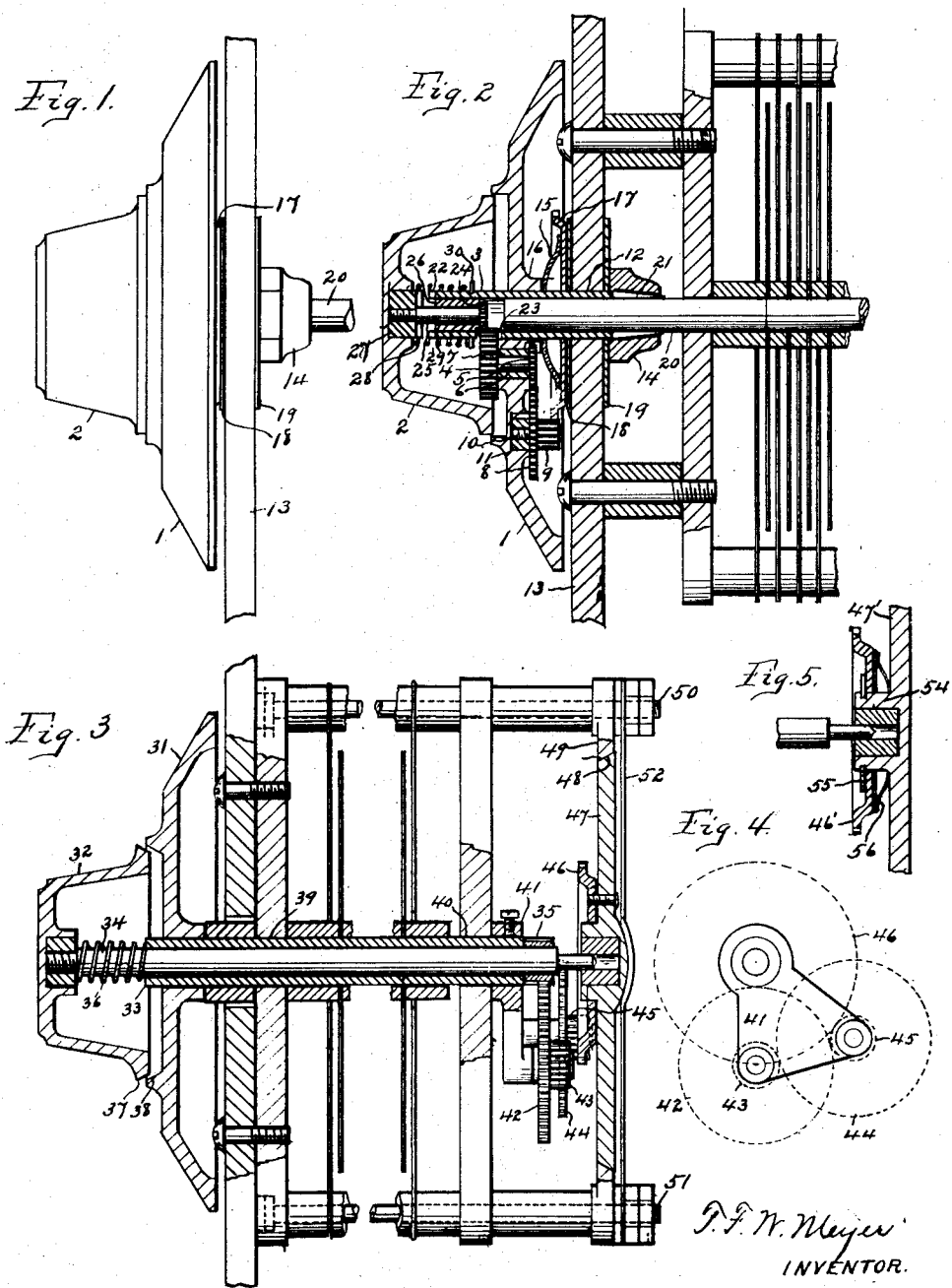

Patented July 5, 1927.

1,634,676

UNITED STATES PATENT OFFICE.

THEODORE F. W. MEYER, OF ELIZABETH, NEW JERSEY, ASSIGNOR TO JAMES R. ENGLISH, OF NEWARK, NEW JERSEY.

VERNIER DEVICE.

Application filed December 1, 1922. Serial No. 604,296.

My invention relates to adjusting devices for use in connection with electrical and other precision instruments where delicate variations of adjustment become necessary to accomplish desired results. In the recent development of radio-telephony, certain of the instruments used, for example, the variometer, the vario-coupler, the variable condenser, and the rheostat, require very fine adjustment to obtain such results as tuning to proper wave-length, tuning out stray atmospheric disturbances, etc., and it is to such tuning devices that my improvement is specifically applicable. But I wish it to be understood that it is not confined to such instruments alone for it may, with slight modification, be applied to any instrument or device where so-called vernier adjustment is desirable or necessary.

In the accompanying drawing forming a part hereof,

Fig. 1 is a plan of my improvement as applied to a well-known form of radio-dial.

Fig. 2 is a section of the same, showing in addition, its application to a well-known form of variable condenser.

Fig. 3 is a section of a modified form applied to a variable condenser.

Fig. 4 is a view of the gear-train bearing bracket, with the pitch circles of the gears shown in dotted lines.

Fig. 5 is a fragmental section of a modified form of the friction device shown in Fig. 3.

Similar reference characters refer to like parts throughout the specification and drawing.

It is to be understood that the application of my improvement to a plate condenser, as shown in the drawing, is illustrative only, and that the device is capable of being applied to other instruments and in other relations.

The dial shown follows the general form and contour of that now in general use for mounting upon a panel. For purposes of illustration, I have shown the dial as made up of the index disk 1, and the separate knob 2. The disk 1 is rigidly mounted upon a tubular shaft 3, and carries a gear train made up of the gear 4, pinion 5, both upon the short shaft 6, which turns in the bearing 7; the gear 8 and pinion 9 secured together and both mounted to rotate upon the short stub shaft 10, which is inserted in the bushing 11, the latter embedded in the disk 1, as shown. The shaft 3 is located in a bearing aperture 12 in the panel 13 and is held against end play by the nut 14 upon the rear side, with the spring washer 15 bearing against the hub 16 of the disk 1 and upon the face of the cupped gear 17, which latter is loosely mounted upon the shaft with its teeth in engagement with those of the pinion 9. The nut 14 is screwed upon the shaft 3 to place the spring washer 15 under sufficient compression to cause the gear 17 to frictionally engage the face of the panel and thus arrest its motion, except under the circumstances hereinafter set forth. If desired, additional friction washers 18, 19 may be placed against the panel and beneath the gear 17 upon the front side, and beneath the nut 14 upon the rear side of the panel.

Within the tubular shaft 3, is a solid shaft 20, to which the particular device to be operated is connected, in the present case, the movable plates of a condenser. This shaft 20 is adjustably secured within the shaft 3 by the nut 14, which is internally coned or tapered to fit the correspondingly tapered end of the shaft 3, which is split as at 21, so that when the nut is screwed up, it will contract the split end to grip the shaft 20. The outer end of the shaft 3 has a series of notches therein to form a jaw clutch member as at 22. A lateral opening 23 is provided in the shaft 3, to permit the periphery of the gear 4 to extend therein, to engage a pinion 24 within the hollow end of the shaft. This pinion 24 is mounted upon the end of a short shaft 25, mounted in a bushing 26, which is forced into the end of the shaft 3, the construction being such that the pinion 24 and shaft 25 may have a slight longitudinal movement in the axis of the shaft 3. The knob 2 is mounted upon the outer end of the shaft 25, with the bushing 27 provided with clutch teeth 28 for engagement with the teeth 22 upon the end of shaft 3. A spring 29 surrounds the end of shaft 3 bearing upon the bushing 27 and the collar 30, the latter upon the shaft 3, so as to normally force the knob 2 outwardly with the clutch members disengaged.

If the knob is turned without depressing it, it will be noted that its rotation will be communicated through the gear train by way of pinion 25, gear 4, pinion 5, gear 8, pinion 9 to the cup gear 17; and since the latter is frictionally held against rotation, the result will be the slow rotation of the disk 1, the rate of such rotation depending upon the gear train ratio. If on the other hand, the knob 2 is depressed to bring the two members of the clutch 22, 28 into engagement, then the rotation of the knob will carry with it the disk as a whole, since the force required will be sufficient to overcome the frictional resistance offered by the cup gear 17 against the face of the panel, or against the friction washer 18. This frictional resistance is desirable in such devices as the condenser shown, or any other of the instruments to which the invention may be applied, to retain the parts in adjusted position and prevent jarring out of adjustment.

In the modified form shown in Fig. 3, I have shown the dial 31 and knob 32 as of the same general form as those above described. The dial is rigidly mounted upon the sleeve shaft 33, and the knob is rigidly mounted upon the solid shaft 34, the latter extending through said sleeve shaft, and having the pinion 35 secured to the protruding end thereof. Between the other end of the sleeve shaft 33 and the interior of the knob 32 is a coil spring 36 whose expansion serves to hold the pinion 35 against the end of the sleeve shaft. The margin of the knob is coned as at 37 to form a clutch member which is designed to engage a corresponding coned clutch member 38 on the face of the disk 31 when the knob is depressed. For the sake of illustration, I have shown a condenser in connection with the shaft 33 extending through bearing apertures in the condenser head plates 39, 40, and having the rotating plates mounted thereon in the usual manner. Upon the protruding end of the shaft 33, I secure the bearing bracket 41, which carries the gear train consisting of the gear 42 in mesh with the pinion 35, the pinion 43 rigidly connected to gear 42, the gear 44 in mesh with pinion 43 and having the pinion 45 rigidly connected thereto for engagement with the cup gear 46. The gear 46 is shown as secured to the face of the disk 47, whose edge is coned as at 48 to engage a correspondingly coned ring 49, which is mounted upon the extended standards of the instrument, as 50, 51. The engagement of the disk and ring is maintained by the flat spring 52 extending across from standard to standard and bearing upon the center of the disk, and is such that when the knob 32 is turned without depressing it, the resistance offered by the disk will hold it stationary, with the result that the pinion 45 will travel slowly around the cup gear 46, the rotation of the pinion 45 being communicated to it through the gear train from the shaft 34 to which the knob is secured. When the knob is simultaneously depressed and turned, the clutch members 37 and 38 engage, and the turning force will be sufficient to overcome the friction between the edge of the disk 47 and the interior of the ring 49, and the entire rotating structure will rotate as a unit.

In order that the pinion 45 may be held in fixed relation with the gear 46, I may provide the center of the disk 47 with a bearing 52, to receive the pivot 53 upon the end of the shaft 34, provision being made for the longitudinal movement of said shaft by making the pivot long, as shown so as to permit end play.

As a slight modification of the friction retarding mechanism for the cup gear, I may use the structure illustrated in Fig. 5. Here, the part 47', corresponding to the disk 47 is held stationary, as by making the ring 49 integral with the disk, and providing a hub 54 in the center upon which the gear 46' is mounted to bear against a collar 55, with the spring washer 56 located between the rear face of the gear 46' and the part 47'. The frictional resistance offered to the gear is sufficient to resist its being turned by the knob alone when not depressed; however, when the knob is depressed to engage the clutch elements 37, 38 (Fig. 3), the whole moving structure may be turned.

I claim:—

In a vernier device of the class described, the combination of a sleeve shaft having an index disk mounted upon one end thereof and a supporting bracket upon the other end thereof, a driving shaft extending through said sleeve shaft and having a turning knob upon its outer end and a driving pinion at its inner end, clutch members respectively upon said knob and disk whereby said shafts may be manually coupled together to rotate in unison, a gear train carried by said supporting bracket and having a gear in mesh with said pinion, and a frictionally retarded gear in mesh with the last element of said gear train, whereby the free rotation of said knob will communicate a materially slower rotation to said driven shaft.

THEODORE F. W. MEYER.